(12) United States Patent
Ito

(10) Patent No.: US 7,165,686 B2
(45) Date of Patent: Jan. 23, 2007

(54) DISK STANDING DEVICE AND STORAGE DEVICE FOR THE DISK STANDING DEVICE

(76) Inventor: Takashi Ito, Room 501, Royalchateaunijigaoka, 166-1, Meito-ku, Nagoya-shi, Aichi 465-0088 (JP)

( * ) Notice: Subject to any disclaimer, the term of this patent is extended or adjusted under 35 U.S.C. 154(b) by 0 days.

(21) Appl. No.: 10/468,823

(22) PCT Filed: Feb. 25, 2002

(86) PCT No.: PCT/JP02/01675

§ 371 (c)(1), (2), (4) Date: Feb. 13, 2004

(87) PCT Pub. No.: WO02/068295

PCT Pub. Date: Sep. 6, 2002

(65) Prior Publication Data

US 2004/0112848 A1     Jun. 17, 2004

(51) Int. Cl.
*A47G 29/00* (2006.01)
(52) U.S. Cl. ..................................... 211/40
(58) Field of Classification Search .............. 211/40, 211/41.12, 41.13
See application file for complete search history.

(56) References Cited

U.S. PATENT DOCUMENTS

| | | | |
|---|---|---|---|
| D360,799 S * | 8/1995 | Rocco et al. ............... D6/629 |
| 5,542,550 A * | 8/1996 | Kakavoulis-Perera et al. ............... 211/40 |
| 5,680,937 A * | 10/1997 | Smith .................... 211/40 |
| 6,070,743 A * | 6/2000 | Hsueh ................... 211/40 |
| 6,074,026 A * | 6/2000 | Pinchuk ................ 312/9.48 |
| 6,705,472 B1 * | 3/2004 | Cross et al. ........... 211/40 |

* cited by examiner

*Primary Examiner*—Sarah Purol
(74) *Attorney, Agent, or Firm*—Morgan, Lewis & Bockius LLP (57) ABSTRACT

In a disk stand device and a disk storage device for use in compact disks, mini disks and floppy disks, an array of grooves (2) are provided on an upper surface of a pedestal (1) at predetermined intervals (L). When one end of a disk (3) is inserted into the groove (2) upon accommodating the disks (3), a plurality of disks (3) are positioned to overlap with the predetermined intervals (L) therebetween. A title labelled on the disk (3) can be visually recognized through the intervals (L) of the neighboring disks (3). Upon reusing the disk (3), the disk (3) can be taken out of the groove (2) quicky to improve an efficiency at offices in which electronic computers are employed.

5 Claims, 13 Drawing Sheets

DISK STANDING DEVICE AND STORAGE DEVICE FOR THE DISK STANDING DEVICE

FIELD OF THE INVENTION

The invention relates to a disk stand device and a disk storage device improved to rationally stand and accommodate rectangular disks such as diskette, compact disk, mini disk, floppy disk and the like.

BACKGROUND OF THE INVENTION

These types of disks are abbreviated as CD, MD and FD and after using the disks by listening to musics or applying to business procedures, the disks are stored in place. Upon storing the disks, the disks are put into box-like drawers or book shelves in such a manner that the disks tightly overlap laterally each other. On each of the disks, a label is put to represent a title of recorded content for the purpose of convenience when reusing them.

However, in cases where the disks are put into the box-like drawers or the book shelves, the disks tightly overlap each other so that it becomes difficult to visually recognize the title labelled on the disks. For this reason, it is necessary to repeatedly take the disks and return them until the desired disk is found upon reusing the disks.

The present invention has been made with the above drawbacks in mind, and has its object to provide a disk stand device and a disk storage device in which titles labelled on disks are visually recognized easily to enable users to take the desired disk quickly so as to readily put into practical use.

DISCLOSURE OF THE INVENTION (1) Upon insertably placing one corner portion of disks into corresponding grooves on an upper surface of a pedestal, a plurality of the disks partly overlap each other with predetermined intervals spaced between the disks. From this reason, it is possible to visually recognize the titles labelled on the corresponding disks from the intervals between the neighboring disks, thus enabling a user to quickly take the desired disk out of the groove.

(2) The pedestal forms an support wall generally L-shaped in cross section, and one corner portion of the disk is insertably placed into the groove while other corner portion of the disk opposes against a vertical wall of the pedestal. The structure is such as to stabilize the disks placed into the corresponding grooves.

(3) A plurality of laterally arranged pedestals are movable to slide lengthwisely each other. By changing sliding degrees of the pedestals, it is possible to make a variety of formations from the laterally arranged pedestals. This diversifies an entire structure and increase a freedom of design to meet a configuration with the place where a disk stand device is located.

(4) A combination of a tenon and mortise makes it possible to slide the pedestals eath other. This structure reduces a manufacturing cost with the minimum mumber of component parts.

(5) Disks are placed on support members generally L-shaped in cross section at predetermined intervals in a box-like casing. By sliding the support members to-and-fro against the box-like casing, it is possible to draw the disks outside from the box-like casing. From this reason, pulling the support members out of the box-like casing exposes the disks overlapping with the predetermined intervals spaced. This enables the user to visually recognize the titles labelled on the corresponding disks from the intervals between the neighboring disks, so that the user can quickly take the desired disk out of the groove.

(6) By tumbling a polygonal pedestal cylinder on a desk or the like, it is possible to insert one corner portion of a disk into a groove on a surface horizontally positioned at the pedestal cylinder for the sake of improved funs and contrivances.

(7) By tumbling a pentagonal pedestal cylinder on a desk or the like, one corner portion of a disk is insertably placed into a groove positioned at an uppermost ridge of the pedestal cylinder. From this reason, it is possible to attain the improved funs and contrivances as mentioned in the item (6).

(8) An array of grooves is axially provided on a ridge portion of an angular pedestal generally inverse V-shaped in cross section. One corner portion of a rectangular disk is insertably placed into the groove positioned at a ridge of the pedestal. The structure is such that a large number of disks can be stored in the angular pedestal with a relatively simple structure. The angular structure stabilizes the pedestal even when the disks are inserted into the corresponding grooves.

(9) One corner portion of a rectangular disk is insertably placed into the groove on a surface horizontally positioned at an inverse tough-shaped pedestal. Due to a lower open end of the inverse tough-shaped pedestal, foreign matters such as dirt and dust gathered at an inner side of the pedestal automatically dorp, thus saving a cleaning procedure so as to keep the pedestal hygenic.

(10) A stepwise pedestal can be tumbled righ and left, one corner portion of a disk is inserted into a groove on a surface horizontally positioned when the pedestal is tumbled. The structure is such that it attracts attention of viewers due to its multi-purpose usage and contrivance.

(11) A plate casing wedge-shaped in cross section has a horizontal base and a block plate slantwisely connected against the horizontal base. An array of grooves is provided on an upper surface of the block plate slantwisely against a lengthwise direction of the block plate. One corner portion of a disk is insertably placed into the groove so as to represent an ornamental and exotic structure as a whole when the plate casing is placed on a desk or the like, thus contributing to an improved efficiency in a job area where business machines are commonly employed.

(12) A plurality of plate casings are provided so that the plate casings are overlappingly gathered each other. The plate casings are gathered with the disks insertably placed into the corresponding grooves. From this reason, it is possible to increase an accommodation capacity in which a large number of the disks are placed with a relatively small accommodation space.

(13) The groove has a wider but shorter supplementary groove overlappingly provided on the groove. This enables the user to insertably place a thicker disk into the supplementary groove. This is especially convenient when selectively placing the disk and a thicker disk case in which the disk is accommodated.

BEST MODE UPON CARRYING OUT THE
PRESENT INVENTION

Referring to darwings, each embodiment of the invention is described as below.

Figure 1:
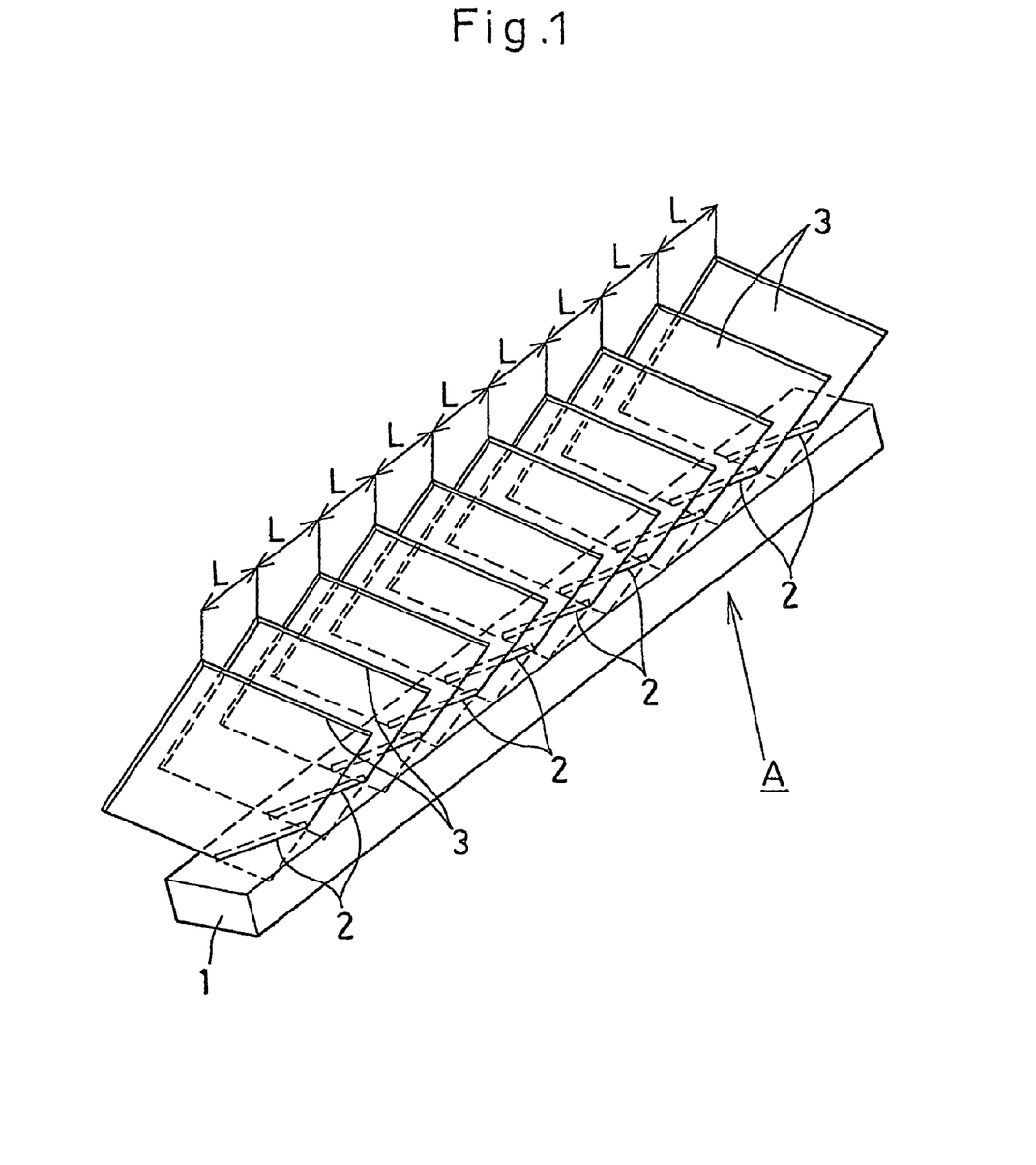
FIG. 1 is a perspective view of a disk stand device according to a first embodiment of the invention.

FIG. 1 shows a disk stand device (A) according to a first embodiment of the invention. A pedestal 1 is elongated and rectangular in cross section as shown in FIG. 1. On an upper surface of the pedestal 1, an array of grooves 2 is provided slantwisely against a lengthwise direction of the pedestal 1 with predetermined intervals (L) spaced. The number of the grooves 2 is ten by way of illustration. The grooves 2 forms an inclination angle ranging from 10 to 70 degrees (e.g., 45 degrees) against the lengthwise direction of the pedestal 1. Into the groove 2, one corner portion of a rectangular disk case or disk 3 is insertably placed. The rectangular disk 3 categorically includes a diskette (DK), compact disk (CD), mini disk (MD) and flopply disk (FD).

In the disk stand device (A), the disks 3 are slantwise against the lengthwise direction of the pedestal 1 and arranged with the predetermined intervals (L) spaced between the neighboring disks 3. From this reason, a plurality of the disks 3 partly overlap each other with the predetermined intervals (L) spaced when the disks 3 are placed into the corresponding grooves 2. It becomes possible to visually recognize the titles labelled on the corresponding disks 3 from the intervals (L) appeared between the neighboring disks 3, thus enabling a user to quickly take the desired disk 3 out of the groove 2.

Figure 2:
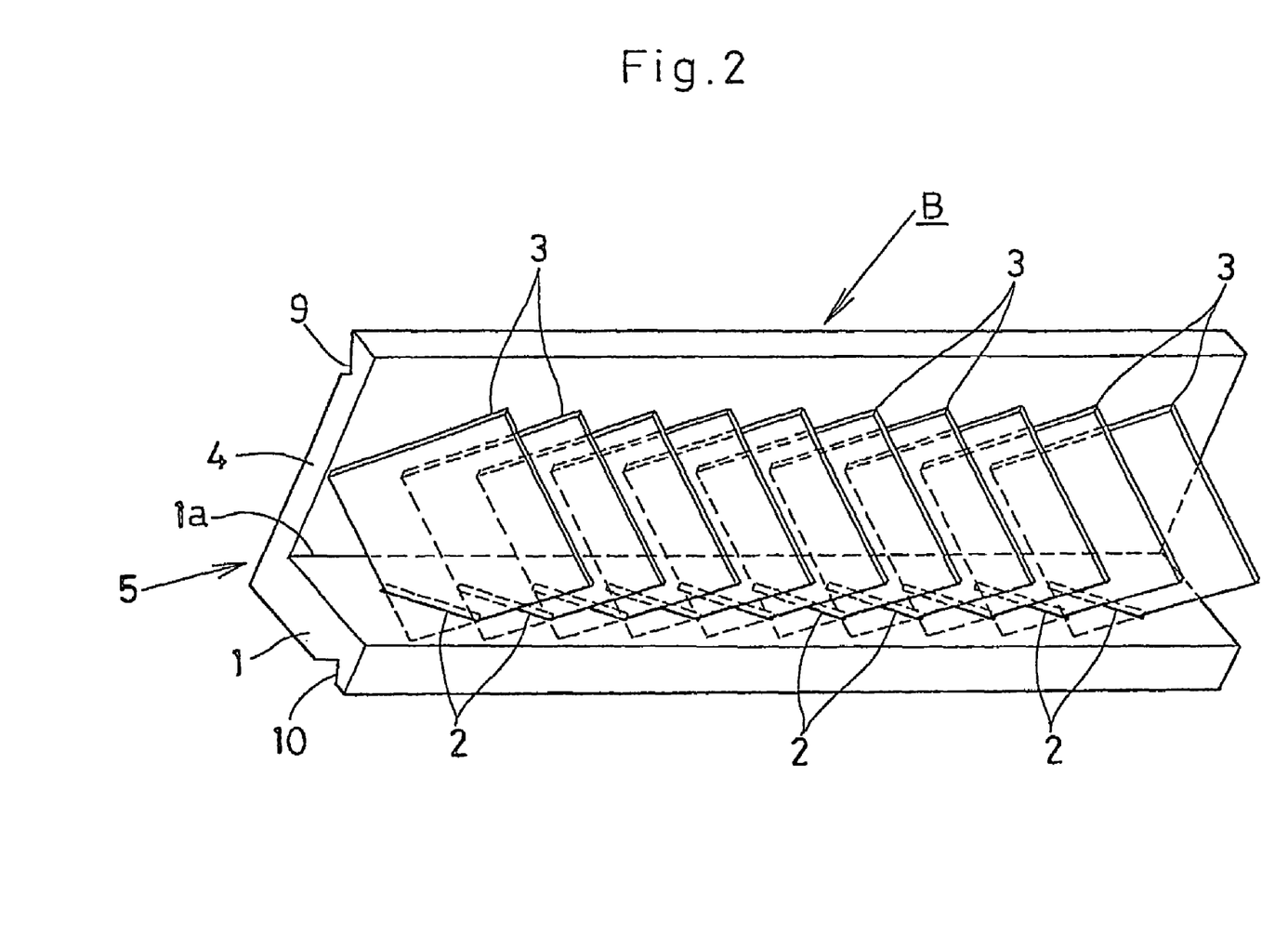
FIG. 2 is a perspective view of a disk stand device according to a second embodiment of the invention.

FIG. 2 shows a second embodiment of the invention in which a rear end 1a of the pedestal 1 has a vertical wall 4 to form a support wall 5 generally L-shaped in cross section as a whole in a disk stand device (B).

In this situation, one corner portion of the disk 3 is insertably placed into the groove 2 while other corner portion of the disk 3 engages with an inner side of the vertical wall 4. The structure is such as to stabilize the disks 3 insertably placed into the corresponding grooves 2.

Figure 3:
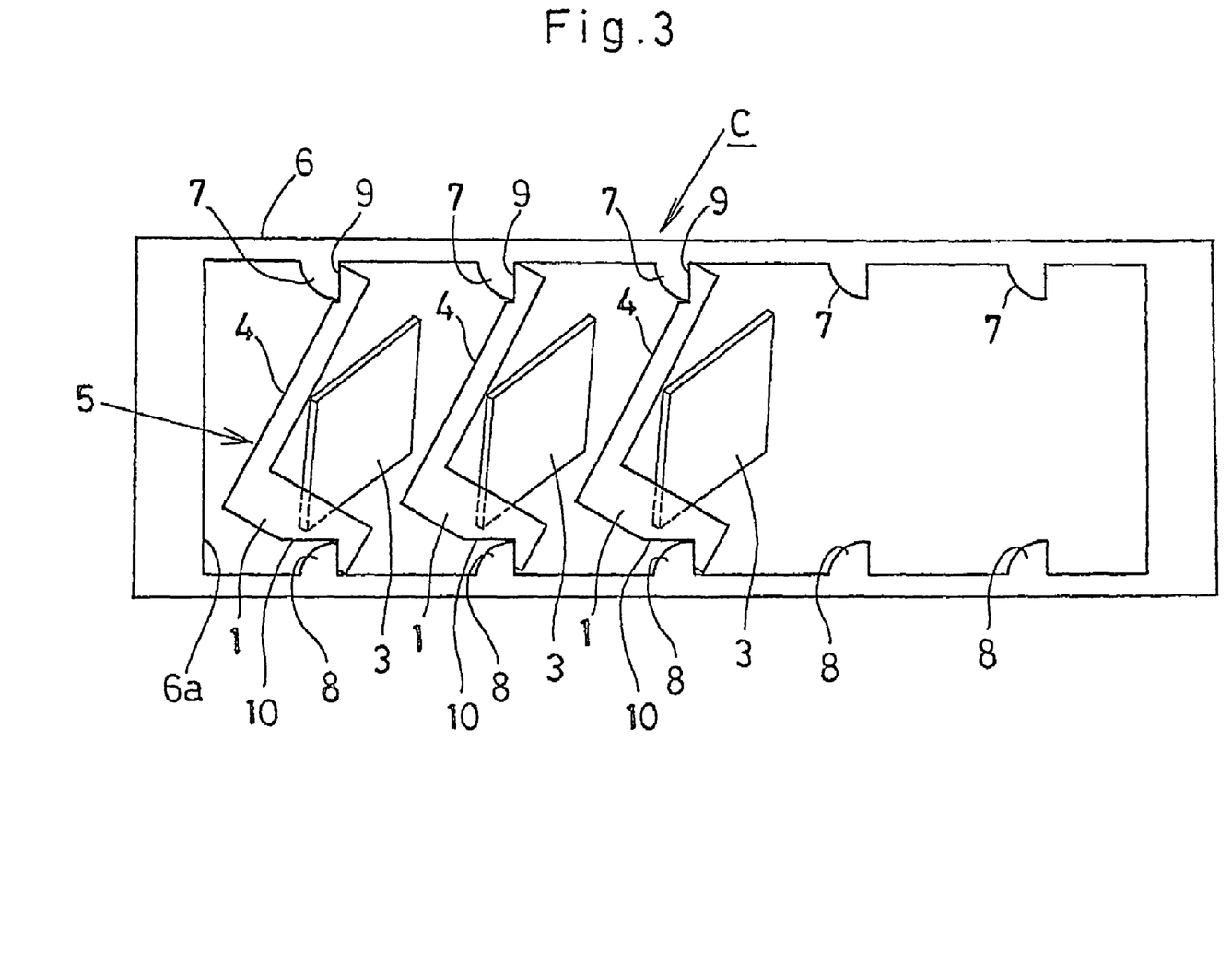
FIG. 3 is an elevational view of a disk storage device according to an embodiment of the invention.

As shown in FIG. 3, a disk storage device (C) has the disk stand device (B) accommodated into a box-like casing 6. An array of upper projections 7 is formed on an upper side of an inner wall 6a of the box-like casing 6 with regular intervals. An array of lower projections 8 is formed on a lower side of the inner wall 6a of the box-like casing 6 in a manner to correspond to the array of upper projections 7.

An upper end of the support wall 5 has an upper channel 9 which slidably engages with the upper projection 7 in a forward and rearward direction. A lower end of the support wall 5 has a lower channel 10 which slidably engages with the lower projection 8 in the forward and rearward direction.

By sliding the support walls 5 to-and-fro against the box-like casing 6, it is possible to draw the disks 3 outside from the box-like casing 6. Pulling the support walls 5 out of the box-like casing 6 exposes the disks 3 overlapping with the predetermined intervals. This enables the user to visually recognize the titles labelled on the corresponding disks 3 from the intervals between the neighboring disks 3, so that the user can quickly take the desired disk 3 out of the groove 2.

Figure 4:
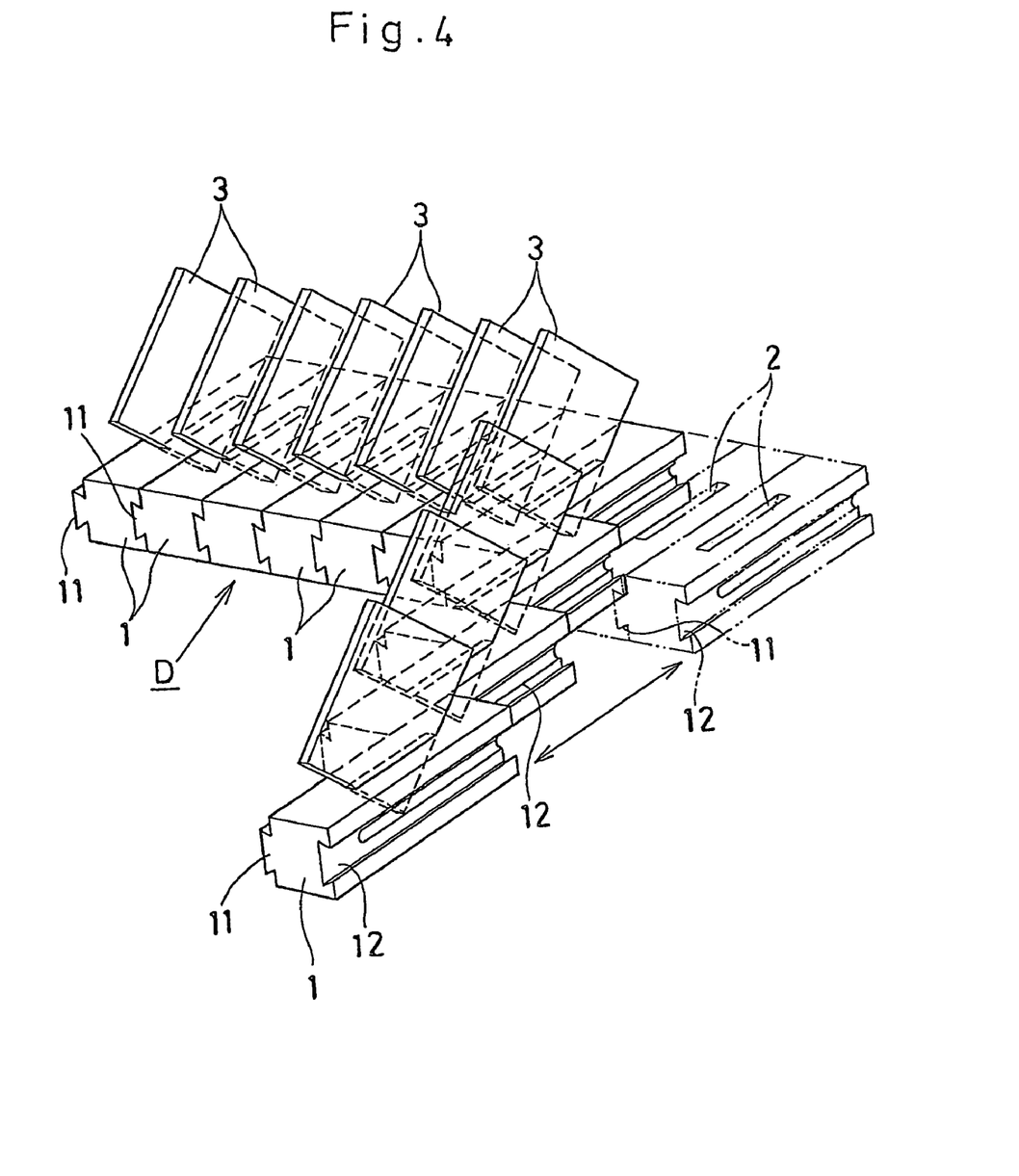
FIG. 4 is a perspective view of a disk stand device according to a third embodiment of the invention.

FIG. 4 shows a third embodiment of the invention in which a plurality of laterally arranged pedestals 1 is movable to slide lengthwisely each other in a disk stand device (D). A groove 2 is provided on an upper surface of each pedestal 1 along its lengthwise direction. One corner portion of the disk 3 is insertably placed into the groove 2. A tenon 11 is provided on one of the opposing sides of the neighboring pedestals 1, and a mortise 12 provided on other of the opposing sides of the neighboring pedestals 1. The tenon 11 is movably fit into the mortise 12 so that the one pedestal 1 slides against other pedestal 1 respectively. The groove 2 may be slantwise against the lengthwise direction of the pedestal 1.

By changing sliding degrees of the pedestals 1, it is possible to make a variety of formations from the laterally arranged pedestals 1 as shown at a solid-lined position and a phantom-lined position. This diversifies an entire structure and increase a freedom of design to meet the configuration with the place where the disk stand device (D) is located. The pedestal may be made from a wood, metals, ceramics and plastics. The disk 3 may be made into a circular, square or polygonal configuration in addition to the rectangular configuration. The disks 3 may be aligned at irregular intervals such as, for example, changing based on an arithmetic series or a geometric series instead of the regular intervals.

Figure 5:
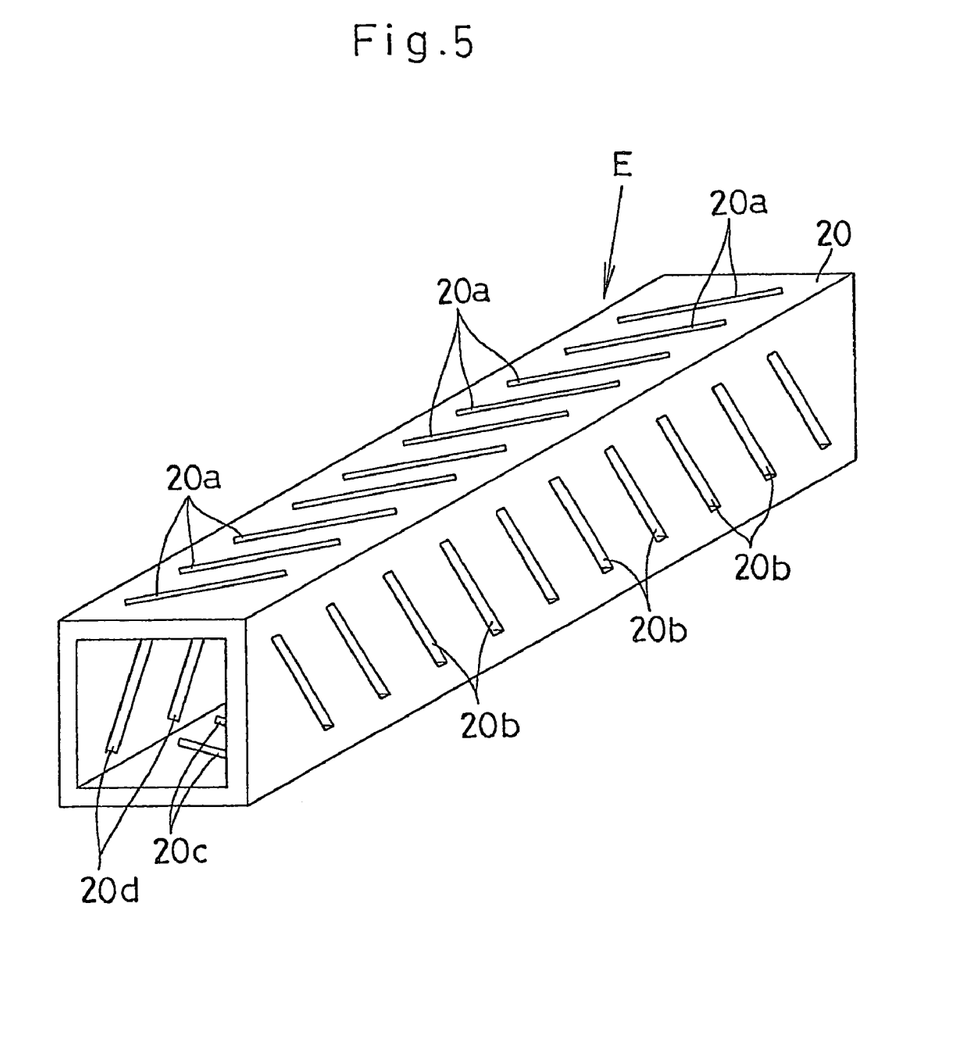
FIG. 5 is a perspective view of a disk stand device according to a fourth embodiment of the invention.

FIG. 5 shows a fourth embodiment of the invention in which a polygonal pedestal cylinder 20 (e.g, quadrangular pedestal cylinder) is provided in a disk stand device (E). Each surface of the pedestal cylinder 20 has an array of grooves 20a, 20b, 20c, 20d which are slantwise against the lengthwise direction of the pedestal cylinder 20. One corner portion of a rectangular disk is insertably placed into the groove 20a on a surface horizontally positioned at the pedestal cylinder 20 when tumbling the pedestal cylinder 20 on the desk or the like. It is to be noted that the pedestal cylinder 20 may be a polygon such as a pentagon, hexagon, octagon or the like.

Figure 6:
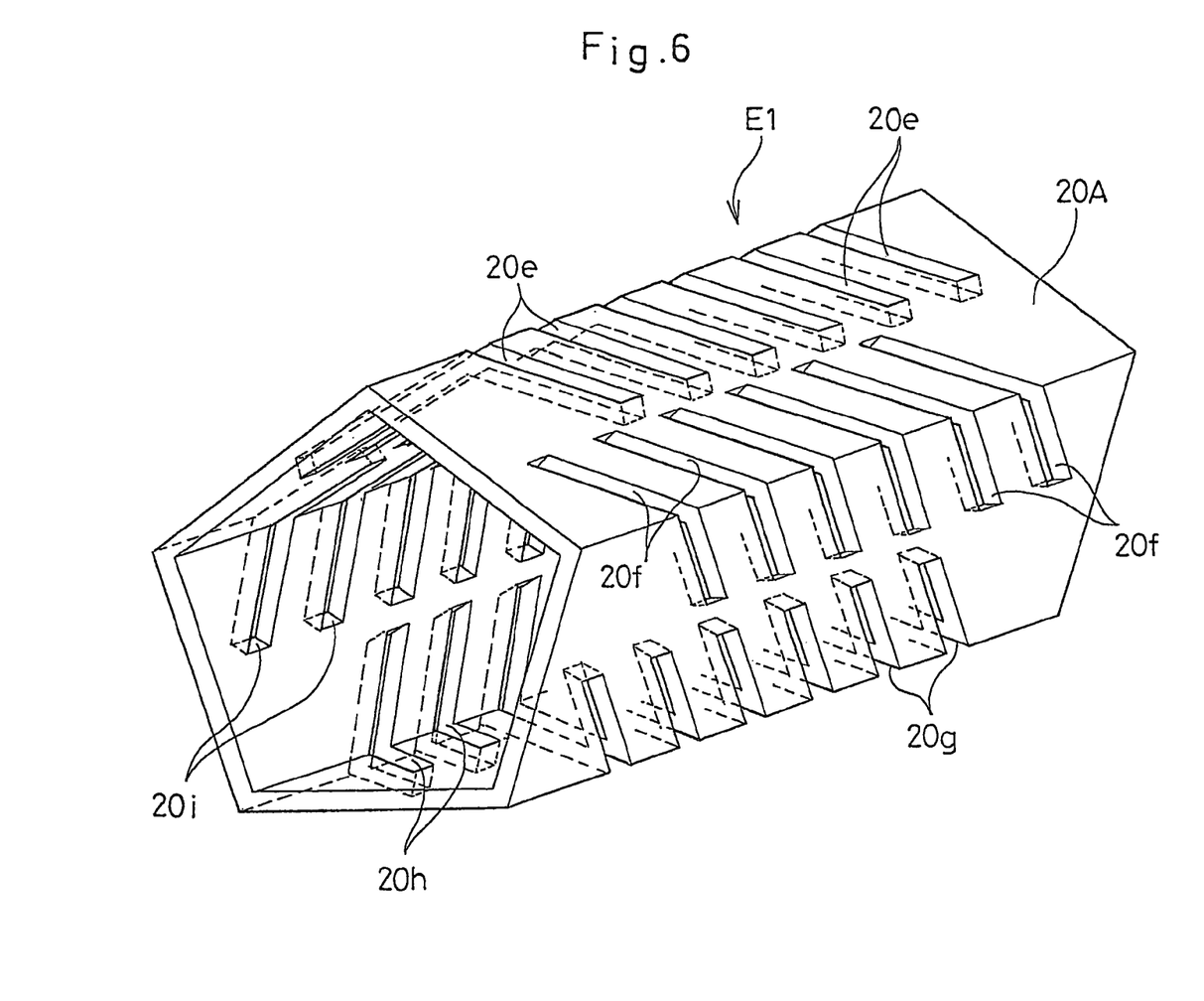
FIG. 6 is a perspective view of a disk stand device according to a fifth embodiment of the invention.

FIG. 6 shows a fifth embodiment of the invention in which a pentagonal pedestal cylinder 20A is provided in a disk stand device (E1). Each apex of the pedestal cylinder 20A has an array of grooves 20e, 20f, 20g, 20h, 20i slantwisely provided to form an angle against corresponding ridges of the pedestal cylinder 20A in its lengthwise direction. By tumbling a pentagonal pedestal cylinder 20A on the desk or the like, a disk is insertably placed into a groove 20e positioned at an uppermost ridge of the pedestal cylinder 20A.

Figure 7:
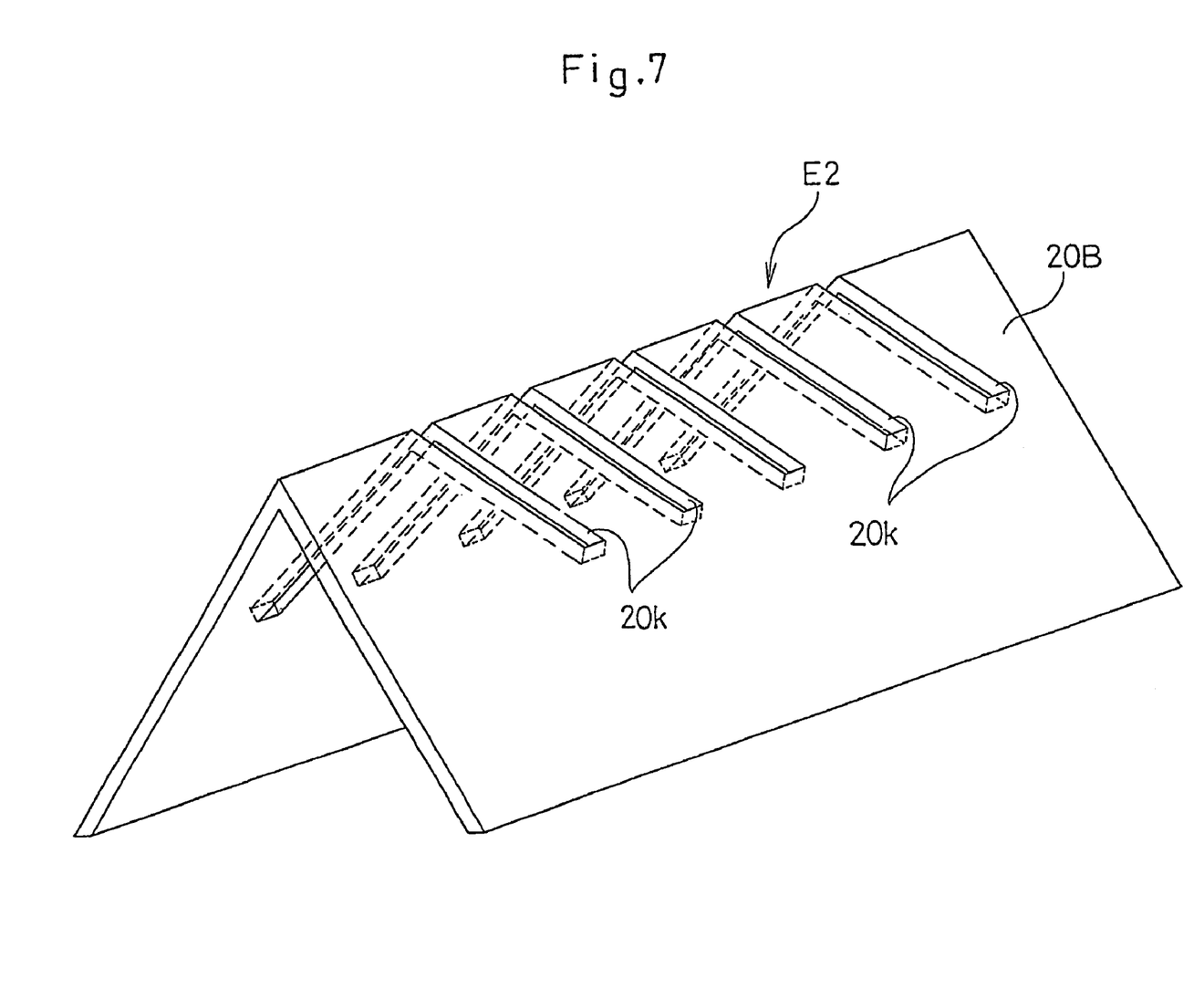
FIG. 7 is a perspective view of a disk stand device according to a sixth embodiment of the invention.

FIG. 7 shows a sixth embodiment of the invention in which an angular pedestal 20B generally inverse V-shaped in cross section is provided in a disk stand device (E2). An apex of the pedestal 20B has an array of grooves 20k slantwisely provided to form an angle against a ridge of the pedestal 20B in its lengthwise direction. One corner portion of the disk is insertably placed into the grooves 20k. It is to be noted that the pedestal may be formed substantially into M-shaped or W-shaped configuration instead of the inverse V-shaped configuration. An array of grooves may be provided on ridge portions (valley and peak portion) of the M-shaped or W-shaped pedestal. This makes it possible to insert the disk into the groove irrespective of whether the pedestal is in a normally standing position or a reversely turned position.

Figure 8:
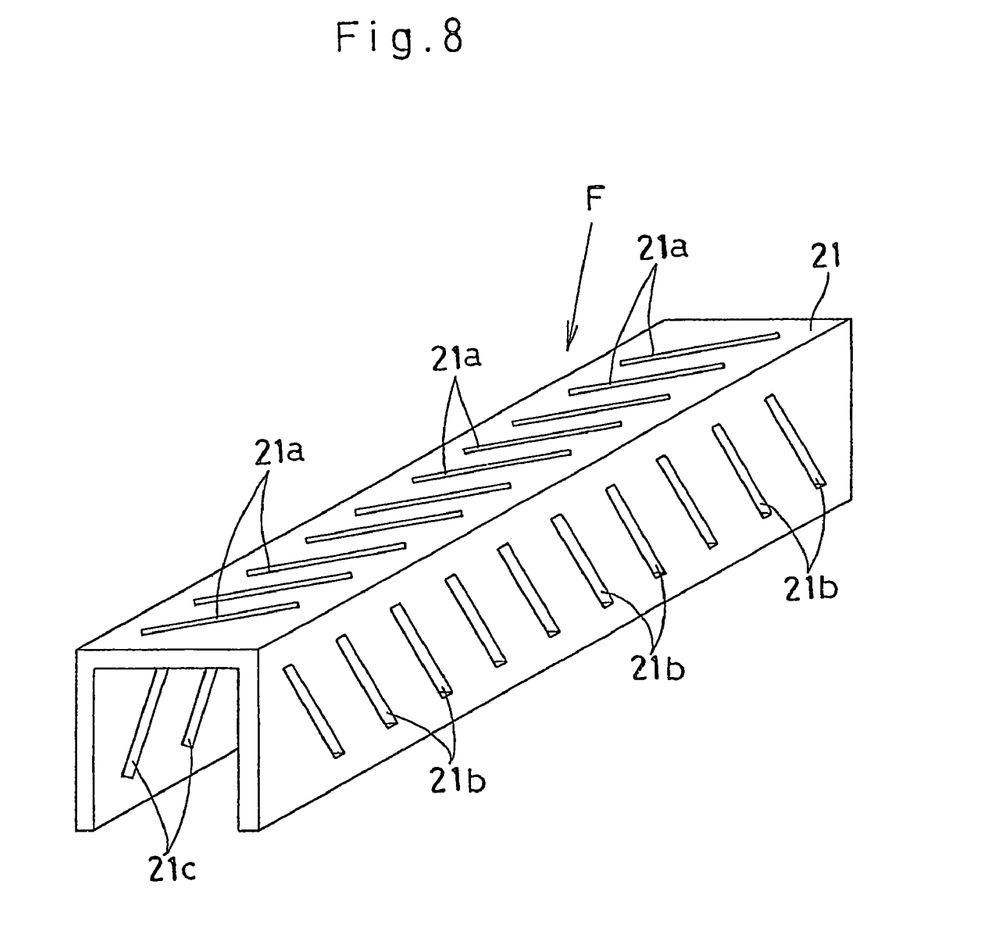
FIG. 8 is a perspective view of a disk stand device according to a seventh embodiment of the invention.

FIG. 8 shows a seventh embodiment of the invention in which an inverse trough-shaped pedestal 21 is provided in a disk stand device (F). Each surface of the pedestal 21 has an array of grooves 21a, 21b, 21c slantwisely provided to form an angle against ridges of the pedestal 21 in its lengthwise direction. One corner portion of the disk is insertably placed into the grooves 20a on a surface horizontally positioned at the pedestal 21.

Figure 9:
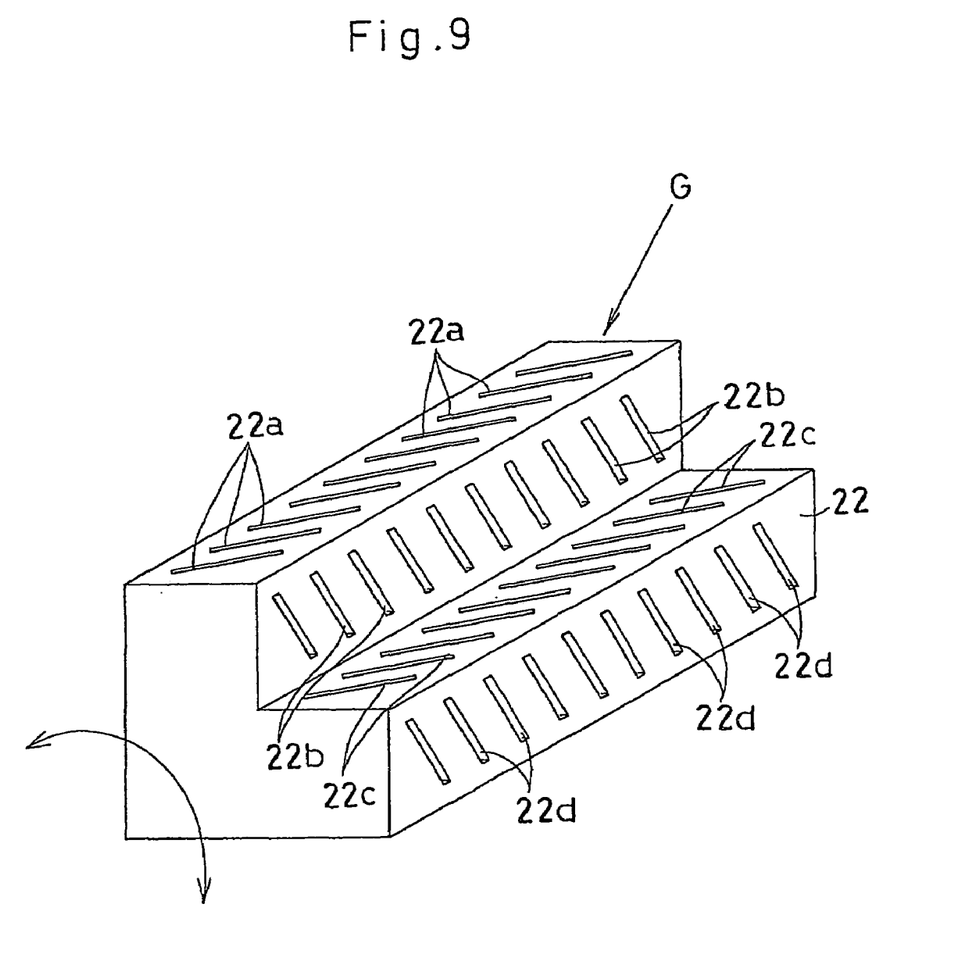
FIG. 9 is a perspective view of a disk stand device according to an eighth embodiment of the invention.

FIG. 9 shows an eighth embodiment of the invention in which a stepwise pedestal 22 (e.g., two steps) is provided in a disk stand device (G). An array of grooves 22a, 22b, 22c, 22d are provided on each step and rung of the pedestal 22. The array of grooves 22a, 22b, 22c, 22d are slantwise to form an angle against the lengthwise direction of the pedestal 22. One corner portion of a rectangular disk is insertably placed to the grooves 22a, 22c on surfaces horizontally positioned at the pedestal 22 when tumbling the pedestal 22. It is to be noted that the pedestal 22 may be formed into a solid or hollow configuration.

Figure 10:
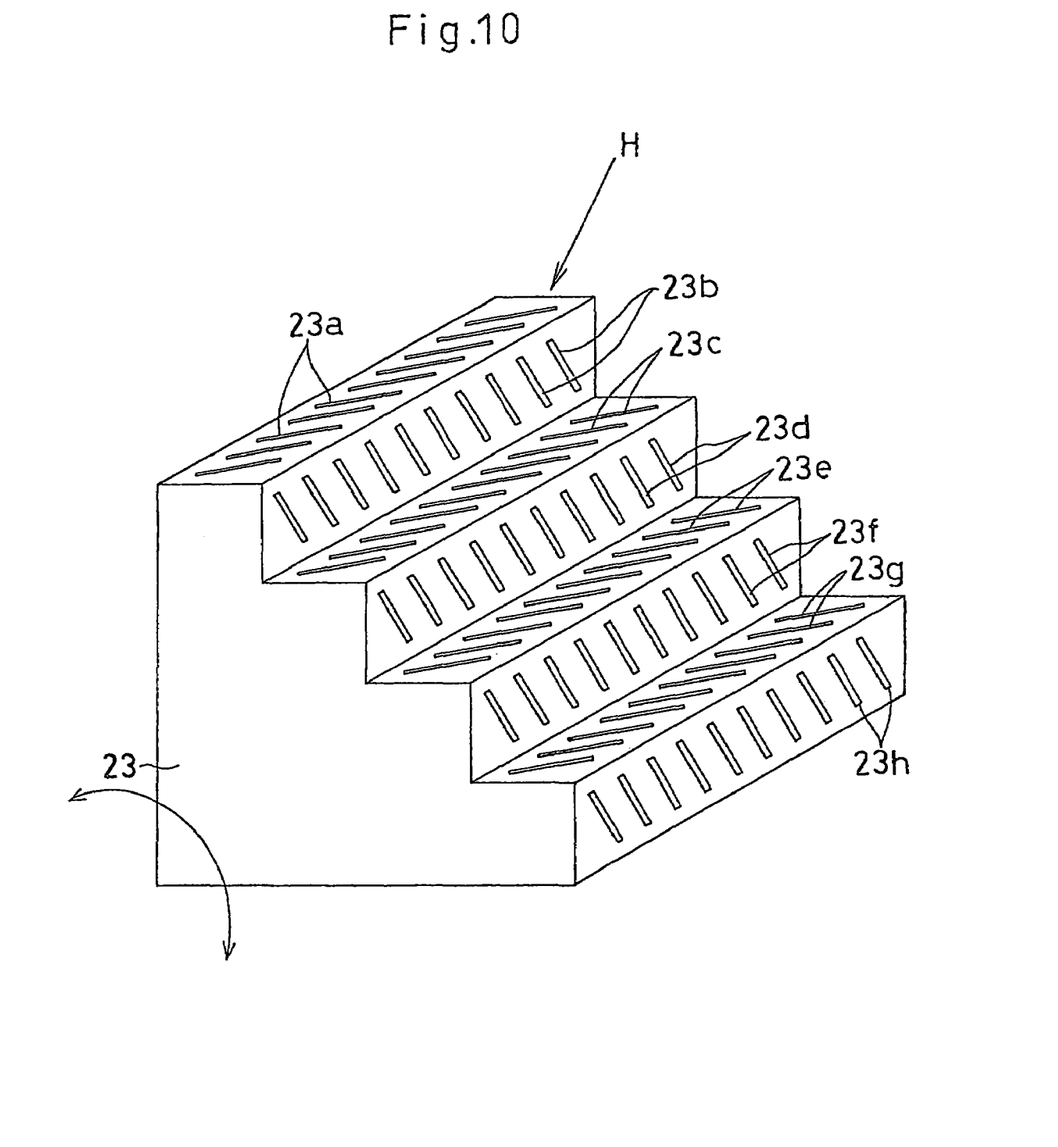
FIG. 10 is a perspective view of a disk stand device according to a ninth embodiment of the invention.

FIG. 10 shows a ninth embodiment of the invention in which a stepwise pedestal 23 (e.g., four steps) is provided in a disk stand device (H). An array of grooves 23a, 23b, 23c, 23d, 23e, 23f, 23g, 23h are provided on each step and rung of the pedestal 23. The array of grooves 23a–23h are slantwise to form an angle against the lengthwise direction of the pedestal 23. One corner portion of a rectangular disk is insertably placed into the groove 23a, 23c, 23e, 23g on surfaces horizontally positioned at the pedestal 23 when tumbling the pedestal 23 in an arrowed direction. It is to be noted that the pedestal 23 may be formed into a solid or hollow configuration.

Figure 11:
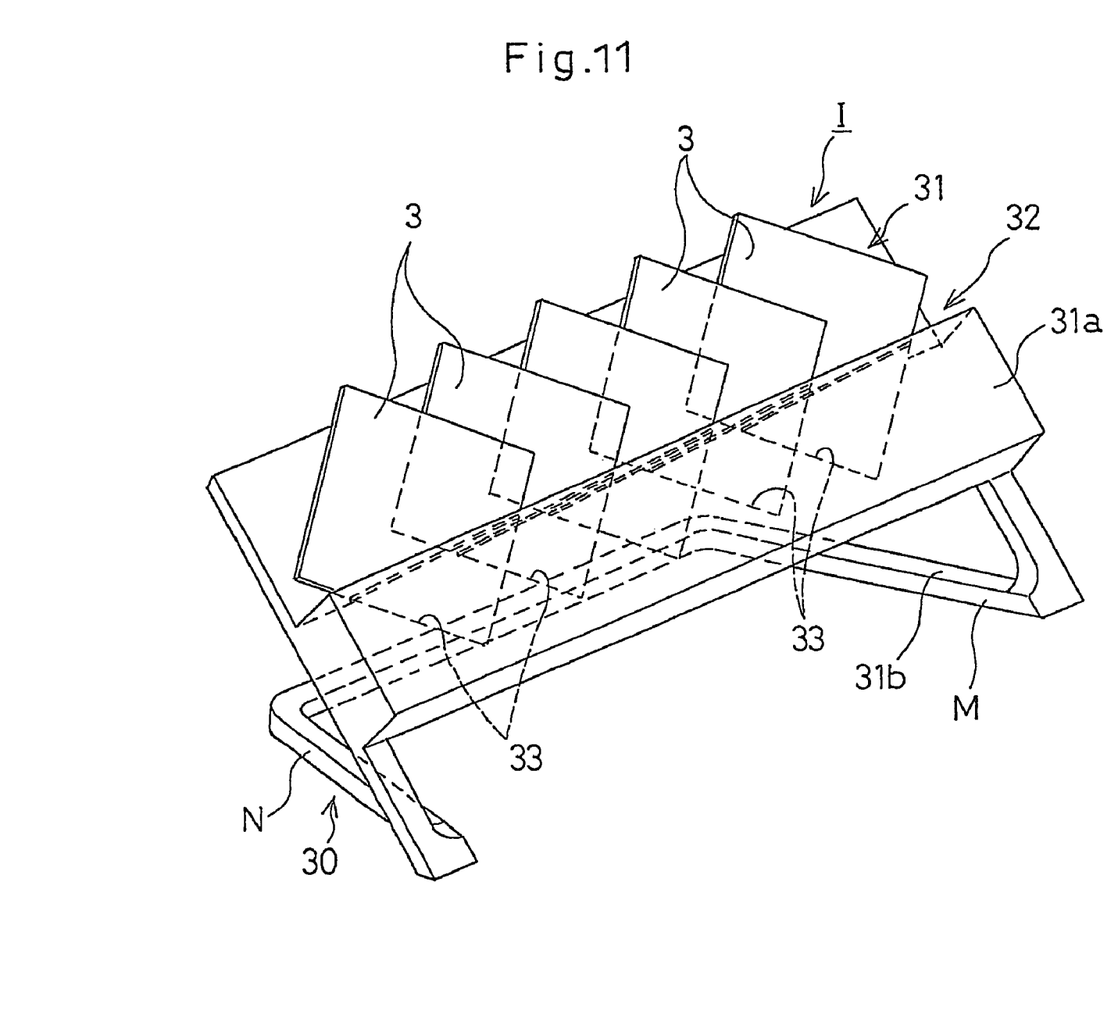
FIG. 11 is a perspective view of a disk stand device according to a tenth embodiment of the invention.
Figure 12:
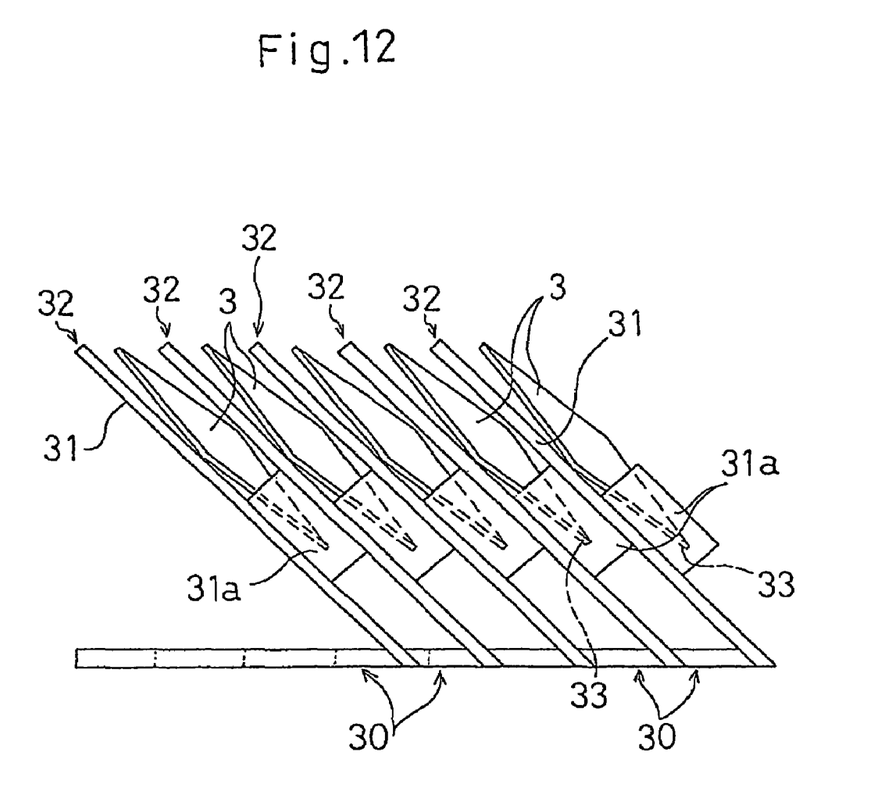
FIG. 12 is a perspective view of a disk stand device in which plate casings are gathered to overlap each other.

FIGS. 11 and 12 show a tenth embodiment of the invention in which a casing plate 32 is provided in a disk stand device (I). The casing plate 32 generally wedge-shaped in cross section has a horizontal base 30 and a block plate 31 slantwisely connected against the horizontal base 30. The block plate 31 has an elongated beam 31a horizontally extending from a left hand side to a right hand side. An array of grooves 33 is provided on an upper surface of the elongated beam 31a. The array of grooves 33 is slantwise to form an angle against the lengthwise direction of the elongated beam 31a so that one corner portion of a rectangular disk is insertably placed into the groove 33. The horizontal base 30 is in parallel with the elongated beam 31a and is formed generally into a lower open ended trapezoidal frame 31b. By gathering the plurality of casing plates 32 collectively, an inner side M of the frame 31b of one casing plate 32 is interfit overlappingly into an outer side N of the frame 31b of other casing plate 32. By gathering several pieces (e.g., five pieces) of the casing plates 32 overlappingly with the disks 3 placed into the grooves 33 as shown in FIG. 12, it is possible to increase an accommodation capacity in which a large number of the disks 3 are placed with a relatively small accommodation space. It is to be noted that horizontal base 30 may be formed into a paired leg-like extensions intoed toward a rearward direction. Any configuration of the horizontal base 30 will be useful so much as the inner side M of the frame 31b of one casing plate 32 is interfit overlappingly into the outer side N of the frame 31b of other casing plate 32.

Figure 13:
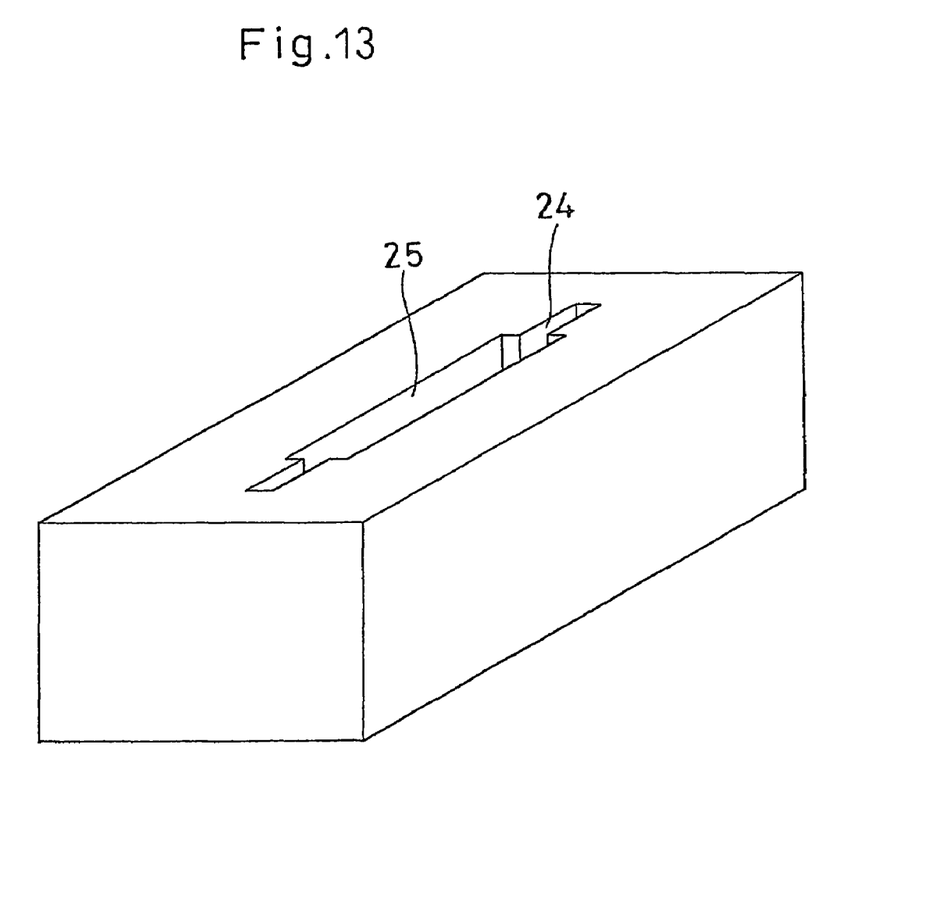
FIG. 13 is a perspective view of a pedestal in which a supplementary groove is depicted according to an eleventh embodiment of the invention.

FIG. 13 shows an eleventh embodiment of the invention in which a groove 24 has a wider but shorter supplementary groove 25 overlappingly provided on the groove 24. This enables the user to place a thicker disk into the supplementary groove 25. This is especially convenient when selectively placing the disk and a thicker disk case in which the disk is accommodated. It is to be noted that the supplementary groove 25 may be applied to the grooves in the first to tenth embodiments of the invention.

INDUSTRIAL AVAILABILITY

Upon accommodating disks such as a floppy disk, mini disk, compact disk or the like after using them, the disks are placed overlappingly with a predetermined intervals spaced. This makes it possible to visually recognize the titles labelled on the disks through the intervals, thus enabling a user to quickly take the desired disk out of the pedestal when reusing it. The disk stand device is particularly useful in the field of the information industry in which personal computers and word processors are commonly employed to improve a business efficiency at a legal, wholesale and retail enterprise as a convenient tool used with a variety of business machines in a serivce industry.

What is claimed is:

1. A disk storage device comprising:
    a box-like casing having a laterally arranged array of upper projections provided at an upper wall of said box-like casing, and having a laterally arranged array of lower projections provided at a lower wall of said box-like casing;
    support members generally L-shaped in cross section and placed at predetermined intervals in said box-like casing, each of said support members having grooves slantwisely against an axial direction of said support member;
    a disk case, one corner portion of which is insertably placeable into said groove;
    an upper channel provided on an upper end of the support member to engage with said upper projection slidably in a forward and rearward direction;
    a lower channel provided on a lower end of the support member to engage with said lower projection slidably in the forward and rearward direction; and
    whereby sliding said support members against said box-like casing enables a user to store said disk case into and draw from said box-like casing.

2. A disk stand device comprising:
    a plate casing wedge-shaped in cross section having a horizontal base and a block plate slantwisely connected against the horizontal base; and
    an array of grooves provided on an upper surface of said block plate slantwisely to form an angle against a lengthwise direction of said block plate; and
    a disk case, one corner portion of which is insertably placeable into one of said grooves.

3. The disk stand device according to claim 2, wherein a plurality of said plate casings are provided so that said plate casings are overlappingly gathered to each other by interfitting one plate casing inside other plate casing, and said plate casings are mutually connected with said disk cases insertably placeable into said grooves when said plate casings are overlapping gathered to each other.

4. The disk stand device according to one of claims 1, 2 and 3, wherein said groove has a wider but shorter supplementary groove overlappingly provided on said groove such that a thicker disk case is insertably placeable into said supplementary groove.

5. The disk stand device according to one of claims 1, 2 and 3, wherein said disk case is one selected from the group including a diskette, a compact disk, a mini disk, a digital video disk, and a floppy disk.

* * * * *